(12) United States Patent
Volkmer

(10) Patent No.: US 7,883,319 B2
(45) Date of Patent: Feb. 8, 2011

(54) METHOD AND DEVICE FOR MONITORING THE STATE OF ROTOR BLADES ON WIND POWER INSTALLATIONS

(75) Inventor: Peter Volkmer, Dresden (DE)

(73) Assignee: Igus-Innovative Technische Systeme GmbH, Dresden (DE)

( * ) Notice: Subject to any disclaimer, the term of this patent is extended or adjusted under 35 U.S.C. 154(b) by 782 days.

(21) Appl. No.: 11/572,835

(22) PCT Filed: Jul. 6, 2005

(86) PCT No.: PCT/DE2005/001187

§ 371 (c)(1),
(2), (4) Date: Apr. 26, 2007

(87) PCT Pub. No.: WO2006/012827

PCT Pub. Date: Feb. 9, 2006

(65) Prior Publication Data

US 2008/0206052 A1    Aug. 28, 2008

(30) Foreign Application Priority Data

Jul. 28, 2004   (DE) ................ 10 2004 036 677
Apr. 12, 2005   (DE) ................ 10 2005 017 054

(51) Int. Cl.
*F03D 11/00*   (2006.01)
*F03D 7/00*    (2006.01)
*F03D 1/06*    (2006.01)
*G01M 19/00*   (2006.01)

(52) U.S. Cl. .................... 416/61; 416/146 R
(58) Field of Classification Search .......... 416/61, 416/146 R, 500; 702/76
See application file for complete search history.

(56) References Cited

U.S. PATENT DOCUMENTS 5,140,856 A    8/1992   Larsen et al. ............. 73/455

(Continued)

FOREIGN PATENT DOCUMENTS

DE    20021970    *   4/2001

(Continued)

OTHER PUBLICATIONS

PCT/ISA/210—International Search Report for PCT/DE2005/001187 filed Jul. 6, 2005 dated Nov. 10, 2005.

(Continued)

*Primary Examiner*—Edward Look
*Assistant Examiner*—Jesse Prager
(74) *Attorney, Agent, or Firm*—Heslin Rothenberg Farley & Mesiti P.C.; Victor A. Cardona, Esq.

(57) ABSTRACT

The invention relates to a method and a device for monitoring the state of rotor blades on wind power installations. According to the invention, structure-borne noise is measured by means of at least one displacement sensor arranged on the rotor blade, the output signals of said sensors determine a frequency spectrum in an evaluation unit by means of suitable methods, the frequency spectrum is compared to reference spectra corresponding to defined states of damage and other particular states and stored in the evaluation unit, and the state of the rotor blade is determined therefrom. The aim of the invention is to provide a method and a device which enable existing local inner and outer damage, and other particular damage-causing states of the rotor blades, to be rapidly identified and evaluated, in order to take into account the effect thereof on the operation of the installation in an automatic manner. To this end, structure-borne noise is measured from a sequence of individual measurements carried out directly one after the other, the beginning of each of said individual measurements being triggered according to a uniform rotational angle of the rotor blade in relation to the rotational axis of the rotor, and all of the determined frequency spectra of each individual measurements are accumulated before being compared with the reference spectra.

35 Claims, 2 Drawing Sheets

U.S. PATENT DOCUMENTS

Figure 1:
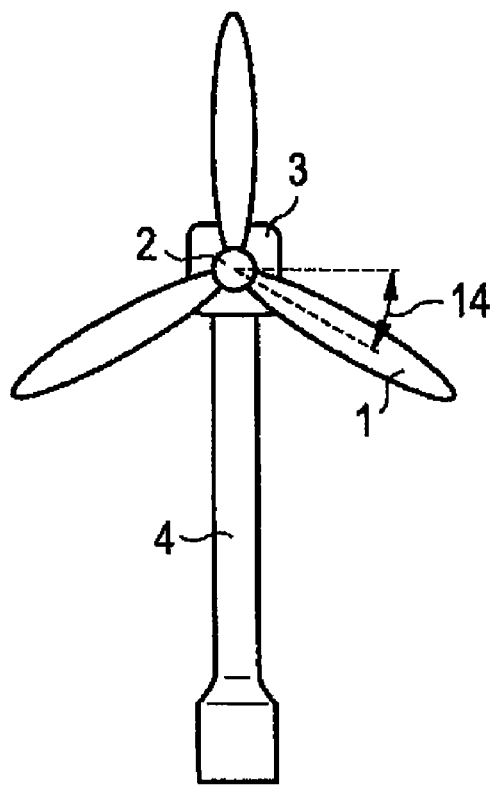

| | | | | |
|---|---|---|---|---|
| 5,471,880 A | * | 12/1995 | Lang et al. | 73/660 |
| 5,739,698 A | * | 4/1998 | Bowers et al. | 324/772 |
| 6,525,518 B1 | * | 2/2003 | Garnaes | 324/76.13 |
| 6,785,637 B1 | * | 8/2004 | Wobben | 702/188 |
| 6,890,152 B1 | * | 5/2005 | Thisted | 416/1 |
| 6,966,754 B2 | * | 11/2005 | Wobben | 416/61 |
| 7,013,203 B2 | * | 3/2006 | Moore et al. | 700/286 |
| 7,072,784 B2 | * | 7/2006 | Wobben | 702/76 |
| 7,246,991 B2 | * | 7/2007 | Bosche | 415/14 |
| 2004/0201220 A1 | * | 10/2004 | Andersen et al. | 290/44 |
| 2005/0068041 A1 | * | 3/2005 | Kress et al. | 324/527 |

FOREIGN PATENT DOCUMENTS

| | | |
|---|---|---|
| DE | 101 60 360 A1 | 6/2003 |
| DE | 101 60 360 B4 | 6/2003 |
| EP | 1 359 321 A | 11/2003 |
| WO | WO/02/053910 | 7/2002 |

OTHER PUBLICATIONS

Notification of Transmittal of Translation of the International Preliminary Report on Patentability (Chapter I or II of the Patent Cooperation Treaty) for International Appl. No. PCT/DE2005/001187 dated Feb. 8, 2007.

* cited by examiner

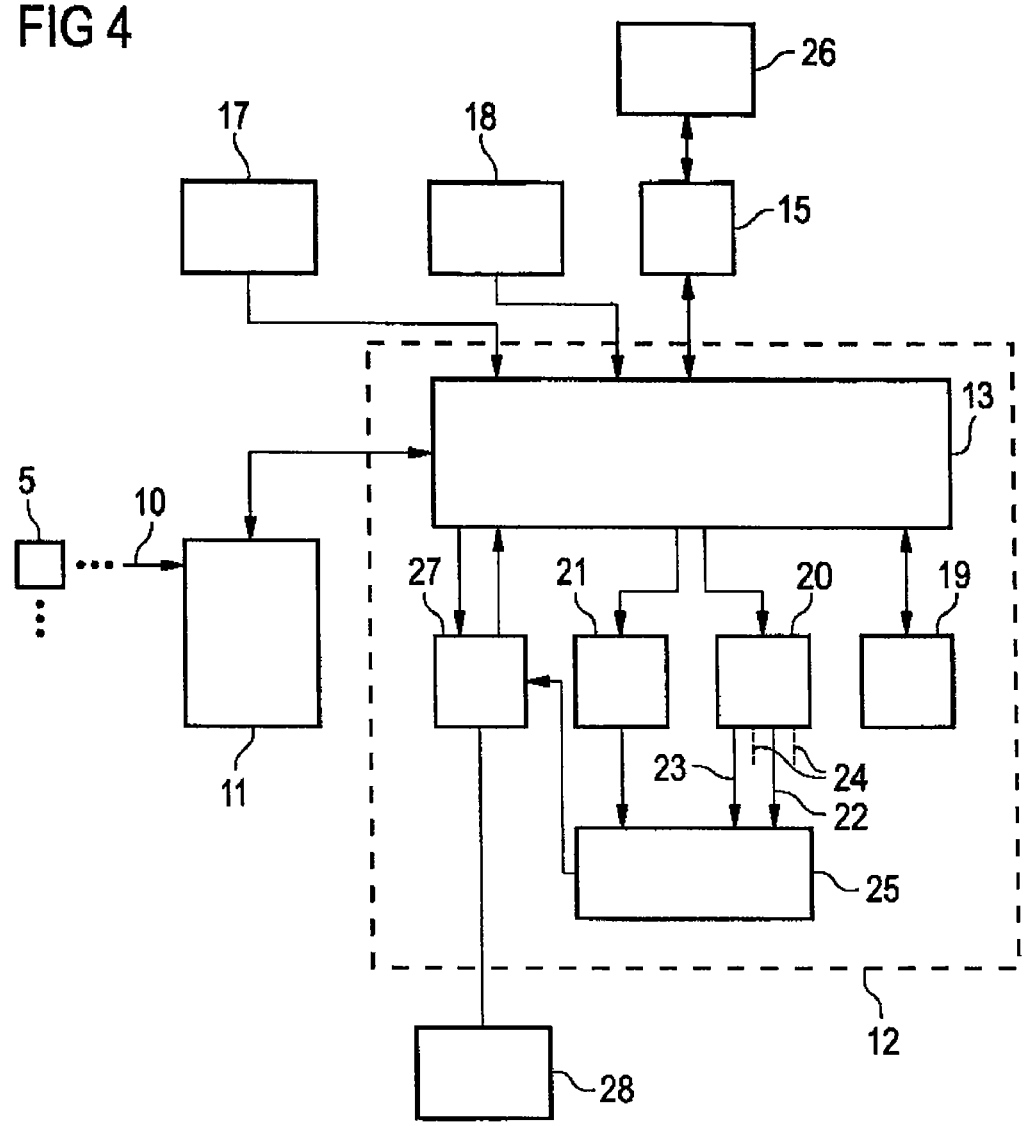

METHOD AND DEVICE FOR MONITORING THE STATE OF ROTOR BLADES ON WIND POWER INSTALLATIONS

CROSS REFERENCE TO RELATED APPLICATIONS

This application is a 371 national stage filing of PCT International Application No. PCT/DE2005/001187, filed on Jul. 6, 2005, and published in German on Feb. 9, 2006, as WO 2006/012827 A1, which claims priority to German Application No. 10 2004 036 677.2 filed on Jul. 28, 2004 and German Application No. 10 2005 017 054.4 filed on Apr. 12, 2005, the entire disclosures of which are incorporated herein by reference.

The invention relates to a method and a device for monitoring the state of rotor blades on wind power installations, with structure-borne noise of at least one rotor blade being measured by means of one or more displacement sensors arranged on at least one rotor blade, the output signals of said sensors being wirelessly transmitted to an evaluation unit that comprises a central computer unit and storage devices and where, from the signals by means of suitable methods, a frequency spectrum is determined, the frequency spectrum is compared with parameterized reference spectra corresponding to defined states of damage and other particular states and stored in the evaluation unit, and the state of the rotor blade is determined therefrom.

Rotor blades are one of the most heavily used components of a wind power installation. They are meant to withstand the huge centrifugal forces, wind flows, turbulence, solar radiation, a wide range of temperatures and ice build-up over several years in continuous operation in order to enable economically efficient operation of the wind power installation. For this reason, early detection of damage in the aerodynamic shell of the rotor blade and to its structural components inside the rotor blade is essential. Several forms of damage, in particular cracks in the shell, delamination, belt and web detachment and chipping, can be rectified in this way before major or even total damage is caused to the entire installation.

Different monitoring systems use a device for recording the stress of the rotor blades by providing sensors or extensometers at different, heavily used points of the wind power installation in order to establish damaging vibrations or elongations as a result of excessive or uneven forces. For instance, document WO 99/57435 describes a wind power installation in which each of the rotor blades is provided with a triaxial accelerometer that displays accelerations of the aerodynamic shells of the rotor blades that are caused by blade and edge vibrations. Natural frequencies of the rotor blades can also be assessed from the sensor signals by means of a computer unit.

However, in this device too, only excessive acceleration stresses in the course of the rotational displacement or in the event of turbulence as well as the effects of major damage to the rotor blade as a whole or abrupt, major changes to the natural frequencies are established without the ability to determine the type of damage or locate it. This is nevertheless necessary in order to enable preventive and especially anticipatory repair, for example in calm weather conditions, in order to attain greater availability and therefore greater effectiveness of the wind power installations.

However, the lack of determination of the type of damage is particularly disadvantageous for invisible damage and long-term changes such as embrittlement of the rotor blade, as essential repair is not possible or even undetected.

Determination of the type of damage is described in the monitoring of rotor blades according to disclosure document DE 100 65 314 A1. Here, damage of the individual rotor blades is determined by determining resonance and natural frequencies, which are generated in rotor blades by means of vibration excitation, and by comparing them maintained reference spectra characteristic of defined states of damage. However, it has been shown that the microvibrations of the structure-borne noise were overlain by random events and interference in such a way that only significant damage could be established despite the explicit vibration excitation. Even a correction of the natural frequencies of the interference by measuring the structure-borne noise caused by the interference, as described in document WO 02/053910 A1, did not lead to reproducible determination and evaluation of nascent and therefore still rectifiable damage of the rotor blades.

The aim of the invention is therefore to set out a method and a device for continuous and individual monitoring of rotor blades on wind power installations with which to identify and evaluate emerging local internal and external damage and damage-causing particular states of the rotor blades at an early stage in order to be able to exert influence on the operation of the installation, preferably in an automated manner.

The method according to the invention is based on the determination of the natural vibrations and the associated harmonic waves of the physically expanded body of a rotor blade that characterize this body in accordance with its specific shape and specific mechanical properties. These natural vibrations produce a wholly typical spectrum for each body. If the body is changed as a result of internal and/or external damage or changes, such as delamination or cracks, the spectrum changes in such a way that certain vibration forms occur in a changed form or not at all. In the same way, the spectrum changes if the material properties, for example the elasticity module or the density, change as a result of extreme stress, aging or weathering. In particular, a shift of the typical frequencies occurs in this respect.

The state of a rotor blade is determined by measuring a series of individual measurements, which are summarized into a measuring period. The individual measurements can be carried out by means of successive measurements of just one sensor, by means of several synchronous sensors or also a combination of both variants. Individual spectra are determined from the signals obtained from the individual measurements and they are accumulated using suitable standardization and weighting methods. In turn, accumulation requires each individual measurement, in terms of its start of measurement, to be triggered according to any rotational angle, although said angle must be fixed for the measuring period.

The accumulation of synchronously determined individual spectra leads to a state spectrum with a greater signal-to-noise ratio and therefore to the possibility of state determination of the rotor blade from the state spectrum with the required reproducibility. The number of individual measurements for a state measurement depends on all kinds of factors that determine the signal-to-noise ratio. These can be measuring-related, but also depend on the available reference spectra or the currently known state of the rotor blade.

With measurements in continuous operation (online measurements), the required vibration excitation is generally carried out by means of the operation itself and the wind blowing at the rotor blade.

According to the invention, the structure-borne noise of the components to which the sensor is fastened is measured with the sensor. However, independently of this, displacements and accelerations of the rotor blade as a whole can thus be measured. In the latter case, only the exceeding of previously defined limit values can be observed. The vibration measurements of the individual rotor blades also enable the known resonance and turbulence monitoring by monitoring the growth of the amplitudes of specific frequencies and stopping it at a particular state when a threshold value is exceeded. The amplitudes of the inertia frequencies and impact frequencies of the rotor blades are preferably monitored for this. The measurements for monitoring the rotor blades are carried out continuously or also as periodically recurring individual measurements in the operational wind power installation. However, they can also be performed on static rotor blades (offline measurements).

It is also advantageous if the structure-borne noise of a rotor blade is measured in a multidimensional manner with several sensors, which are preferably differently aligned and synchronized. This embodiment makes it possible to assess the different vibration directions of a defined vibration state and thus refine the state determination. However, in this respect, measurement with several sensors on one rotor blade only requires the described synchronization in terms of the rotational angle of the rotor blade if the measurements should or can be carried out not simultaneously but in a staggered manner. With several and/or multidimensional sensors per rotor blade, several one-dimensional to multidimensional spectra are determined. In this case, determination of the individual spectra is executed, for example through Fourier transformation, in special coordinate and reference systems that allow optimum description and linking of the different multidimensional vibration states. For instance, an advantageous embodiment of the method provides for the vibration characterization to be carried out in a suitable coordinate system, preferably a spherical coordinate system.

The individual measurements of a measuring period can be triggered according to a uniform rotational angle according to the invention on the basis of hardware and software. Hardware-based triggering preferably occurs by means of an additional sensor that passes on up-to-date rotational angle information to a sensor supply and measuring value preprocessing unit that controls the measurement, with the result that the start of all individual measurements is directly linked to the rotational displacement of the rotor in terms of time. In contrast, software-based triggering uses only one section of a larger, freely selectable measuring range that comprises at least the number of rotations that corresponds to the number of selected individual measurements. The actual triggering of each individual measurement of a measuring period according to a uniform rotational angle therefore occurs in the evaluation unit by selecting each individual measurement from the larger measuring ranges of one or more measurements by means of periodicity-specific starting criteria. However, it is also possible to replace the synchronization with other suitable hardware-based or software-based measures.

In accordance with the preamble of claim 1, the state of the rotor blade is determined by comparing the state spectrum determined from the accumulated individual spectra with the reference spectra stored in an evaluation unit, which are parameterized and characterize defined states of damage and particular states of the special rotor blade or at least of the rotor blade type. As the material identifiers that determine the natural frequencies of the rotor blade also depend very heavily on meteorological and installation data, it is particularly advantageous if the reference spectra are parameterized by means of meteorological and/or installation-specific data and additional sensors for measuring meteorological and/or installation-specific measuring values and/or installation-specific vibration states are arranged on the wind power installation for this purpose. Insofar as several adjacent wind power installations are monitored, the meteorological measuring values of a suitably equipped wind power installation can of course also be used for the others.

In an additional embodiment of the method, for the spectrum comparison, provision is made for the parameters of the reference spectra to be determined in an up-to-date manner in parallel with the structure-borne noise measurement by means of additional measurements and transferred to the evaluation unit. In this way, the comparison can be limited to the spectra with similar up-to-date reference parameters, which is particularly significant in cases where the state spectra must be subjected to a statistical evaluation or equivalence assessments due to a lack of reference spectra of special rotor blade types.

Furthermore, the measured state spectra can be compared with the reference spectra by means of suitable pattern detection methods and therefore automated classification thereof, as is known from computer science. The use of suitable statistical methods can also be advantageous for assigning the measured frequency spectra to the reference spectra, as precise matching of the spectra to be compared will practically not occur. For pattern detection in particular but also for direct spectrum comparison, an additional embodiment of the invention provides for the natural frequency values determined from the spectrum analysis as well as their amplitudes to be represented in vectors or matrices.

It is also particularly advantageous for reproducible state determination of a rotor blade if the frequency spectra of the individual measurements of the rotor blade are adjusted for the interference that is transmitted from the installation to the rotor blade by taking into account the interference, for example that of the drive system, as a frequency spectrum. For this purpose, structure-borne noise measurement by means of one or more one-dimensional or multidimensional sensors is preferably performed in the surroundings of the interference source and the frequency spectra of the interference that is transmitted to the rotor blades are determined therefrom. With these interference spectra, the spectrum changes from the measurements on the rotor blades are corrected with suitable mathematical methods, meaning that they cannot be assigned to changes on the rotor blades.

When establishing a damage state on a rotor blade, the interference signals can also be determined by means of a comparative spectrum analysis of the state spectra preferably measured synchronously on all three rotor blades 1 and can be used for correction as, in contrast to the state change of a rotor blade, the interference entry occurs evenly in all three rotor blades and leads to the same change of all three state spectra. For this, according to an additional embodiment of the invention, synchronized measurements of all rotor blades of a wind power installation are performed and the state change of a rotor blade is determined from the difference of the accumulated frequency spectra of all rotor blades and the comparison of the difference spectra with reference spectra.

With the different interference measurements, a baseline is continuously determined that represents the system-inherent influences on the state spectra and with which the measured state spectra can be continuously corrected in an up-to-date manner.

As states of damage that allow continuation of operation of the wind power installation for a certain amount of time without jeopardizing the installation can also be established with the method according to the invention, it is favorable for the reference spectra to be subdivided into at least two state groups and for the state of a rotor blade to be assigned to one of the state groups by means of the spectrum comparison. For example, the two main state groups could be "significant" and "non-significant" deviations from the normal state, with only the significant deviations requiring immediate repair or even interruption of operation. In contrast, the non-significant deviations allow continuation of operation and, if applicable, shorter test cycles or the allocation of repair to the next possible, e.g. calm, period. Furthermore, for these decision variants, additional subdivisions of the deviations can be carried out, for example in accordance with the location of the changes, on the supporting system or aerodynamic system, or in accordance with different particular states, ice build-up or resonance.

A highly critical particular state is ice build-up on the rotor blades, partly due to the strongly increasing stress as a result of the uneven weight of the ice and partly due to the tension that is transferred from the ice layer to the aerodynamic shell of the rotor blade. The expansion of the ice and sometimes also local detachment of the ice layer from the rotor blade shell can be established by means of stochastic, pulse-type shell events, some of which are perceived as cracking noises in the audible frequency range. As these shell events are reflected in the frequency spectra of the rotor blades by a large number of harmonic waves in the low-frequency range, according to particular embodiment of the invention, the harmonic waves in the accumulated frequency spectrum, and in particular the harmonic waves of the rotational frequency of the rotor blades in the accumulated spectrum, are determined. The correlation of the shell events with the rotational frequency is attributable to the fact that, particularly in the course of the rotational displacement, load changes and associated tearing and impact processes in the ice and therefore the established characteristic harmonic wave pattern are attained.

For the direct response to the determined rotor blade states, an additional favorable embodiment of the method makes provision, with defined states of a rotor blade, for a state message to be generated, for the latter to be transmitted to the installation control system of the wind power installation and for influence to be exerted on the operation of the wind power installation, the above taking place in the evaluation unit which, in accordance with a favorable embodiment of the device, to monitor the rotor blades, comprises an output unit, preferably with a binary output module. The state messages are preferably available in the form of internal and external interference-proof binary and redundant state signals that can be transferred to the installation control system in order to be able to directly exert influence on the operating mode of the wind power installation if corresponding damage states have been determined. Influence is exerted in accordance with the determined state of damage or particular state, for example in the form of a pitch angle adjustment or also shutdown of the system, but can also be start-up of the installation after the end of ice build-up.

In addition to the described state determination by means of vibration excitation through continuous operation, it can also be advantageous for a rotor blade to be actively stimulated by means of a vibration exciter. This is particularly taken into account for offline measurements, but can also be used for online measurements, for example in order to check a natural frequency known from preceding measurements. Active stimulation of the respective component for offline measurements is carried out with at least one one-dimensional or multidimensional vibration exciter (actuator) that is suitably arranged on the rotor blade or on an internal component of the rotor blade. The actuator is preferably a "shaker" with a power amplifier that stimulates the rotor blade across a relevant frequency range by passing through this frequency range (sweep mode). The vibration excitation is favorably controlled by a central computer unit. In order to avoid dampening the microvibrations of the rotor blade, to avoid overlaying by means of interference or to simulate the assembled state, in the event of individual measurements of an individual rotor blade, the latter is to be clamped or mounted appropriately. Such individual measurements are performed after the manufacturing process for quality checking and to obtain reference spectra characteristic of the rotor blade, but also serve to check the wind power installation after transportation or in different assembly stages.

Insofar as the spectrum library comprises no reference spectra for a specific rotor blade type or none of the maintained reference spectra can be called on for comparison for other reasons, it is also possible for the reference spectra to be determined from statistically evaluated and equivalence-assessed frequency spectra of preceding structure-borne noise measurements of the relevant rotor blade. The state spectrum thus obtained is subjected to a spectrum analysis and the numerical values for natural frequencies contained in the spectrum, if applicable fundamental waves and harmonic waves, and their amplitudes are obtained. These are then represented in vectors or a matrix, for example. These spectra obtained at the beginning of deployment of a rotor blade are arranged together in the central computer unit.

In accordance with an additional embodiment of the invention, wireless transmission of the reprocessed and pre-processed measuring signals of the sensor is carried out by means of radio transmission. In this way, the operator of the wind power installation has a wide variety of options for arrangement of the evaluation unit in accordance with space, accessibility, connection to a reprocessing system or other criteria. The evaluation unit or at least parts of it can, for example, thus be installed in the nacelle, in the base of the tower or physically separate from the wind power installation, in accordance with a particular embodiment of the device, as a central evaluation unit monitoring several wind power installations, the type of radio transmission used also depending on the distance between the communication partners, namely the evaluation unit and the sensor supply and measuring value pre-processing unit. It must also be borne in mind that this partly involves time-critical process data, as in the event of resonance monitoring or verification of ice build-up, for example.

In accordance with a particularly advantageous device for executing the monitoring process, the sensor(s) inside or outside the rotor blade is/are firmly fastened to a surface of the aerodynamic shell and/or to internal components of the rotor blade. As monitoring is carried out on the basis of the natural frequencies obtained from accumulated individual spectra, it is possible to monitor the aerodynamic shell as well as any internal load-bearing shell-supporting components or other structural elements. Depending on the load profile of the rotor blade, sensors can be mounted for this, especially at the critical points of the supporting frame and the shell, by firmly connecting them with its surface. An additional embodiment of the device thus provides for at least one sensor to be fastened to a surface of the aerodynamic shell of the rotor blade in the lower third of the rotor blade facing the rotor blade base.

Fastening can be carried out with the wide range of methods that are suitable for transferring the vibrations to the sensor in an almost damping-free manner whilst resisting the continuous load. For example, a possible embodiment of the device according to the invention provides for attachments for holding sensors to be arranged inside and/or outside the rotor blade at different vibration-relevant points. These attachments can easily be fastened during assembly of the rotor blade, whereas the sensors can be mounted individually later in accordance with the requirements and the additional measuring technology of the respective operator, and can also be mounted by the operator itself if applicable. In addition, it is possible to replace or retrofit individual sensors later.

Furthermore, it is particularly advantageous if the sensors are accelerometers, as these sensors are predominantly used for vibration measurement, meaning that there is a range of embodiments for a wide range of requirement profiles. However, other suitable vibration sensors can, of course, also be used.

For instance, it is favorable if a one-dimensional sensor is used and has a displacement orientation that is largely aligned vertical to the surface on which the sensor is fastened. In this arrangement and orientation of the sensor, the transversal waves of the structure-borne noise of the shell are measured that have the greatest information content for the subsequent structure-borne noise analysis, meaning that the one-dimensional measurement constitutes a favorable process in terms of evaluation requirements and costs for continuous monitoring during operation of the wind power installation.

Of course, in order to be able to perform location of existing minor damage on the rotor blade, for example, two-dimensional or multidimensional sensors that can also have another alignment of their displacement orientation can be used alongside or instead of this individual sensor that is aligned in a surface-normal manner.

When using several sensors, regardless of whether one-dimensional or multidimensional, measurement by means of the sensors in the manner described above for state determination of a rotor blade is preferably to be synchronized, for example by means of an additional trigger sensor suitable for the rotational angle measurements. In this way, it is possible to assess the different vibration directions of a defined vibration state.

It is also favorable if data and parameters of the rotor blade are directly determined by means of additional sensors. For instance, a distinction can be made between the ambient temperature and the temperature of the rotor blade and, if applicable, between the temperature of the front and the temperature of the back of the rotor blade so that the temperature measurement of the rotor blade can be carried out in an advantageous manner independently of the measurements of the meteorology module by means of one or more temperature sensors on the rotor blade. With pitch-controlled installations, the actual measurement of the pitch angle is expedient by means of a position sensor fastened to the rotor blade.

In an additional embodiment of the monitoring device, a database that preferably enables fast, selective access is stored in the evaluation unit as a spectrum library with reference spectra of rotor blades with damage-free and defined states of damage and particular states. These reference spectra refer to the rotor blade type to be monitored, have a data structure as per the spectrum to be measured and are parameterized in terms of the above-mentioned applicable meteorological and machine-specific measuring values and are in turn arranged by state of damage and particular state. Ice build-up on the rotor blade, for example, is a particularly significant particular state. Parameterization of the reference spectra is also possible according to data that can be supplied in an up-to-date manner to the ongoing monitoring or stored, for example its angle of incidence in relation to the shaft (pitch angle), the age of the rotor blade, the charge, additional production-related differences or similar relevant physical parameters. These reference spectra have, for example, been determined from measurements on wind power installations in which states of damage have occurred, through offline measurements on undamaged and damaged rotor blades on the ground and/or through equivalence assessments.

In particular for the ongoing updating of the spectrum library, for example from the continuously obtained measuring values, for general data backup or for information exchange between the jointly monitored wind power installations as well as between the installations and the operators, it is favorable for the evaluation unit to be connected to a decentralized, remotely set-up backup server. Items stored on the backup server include the communication data of operators and operations managers of wind power installations. If an event occurs, the backup server can also transmit information to this group of people.

The process and the device required for it are explained in an execution example of a windpower installation with three rotor blades. In the associated drawing, FIG. 1 shows a diagrammatic overall view of a wind power installation FIG. 2 shows a diagrammatic representation of a rotor blade FIG. 3 shows a diagrammatic sectional representation of a rotor blade and FIG. 4 shows a diagrammatic block diagram of the device according to the invention.

FIG. 1 shows an overall view of a wind power installation with three rotor blades 1, which are fastened to a hub 2. In turn, the hub 2 leads into a horizontally mounted shaft. The shaft ends in a nacelle 3, which comprises the machine technology that is not described in further detail and is arranged at the top end of a tower 4 in a rotating manner around a vertical axis.

Figure 2:
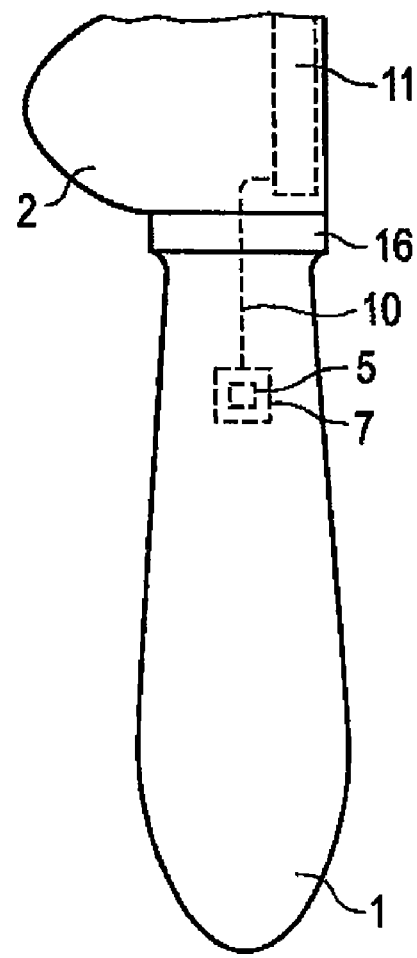
Figure 3:
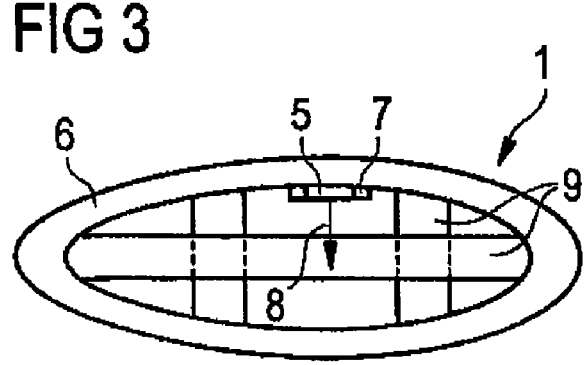

In the execution example shown, according to FIG. 2 a one-dimensional accelerometer 5 is fastened on an inner surface of the large, free aerodynamic shell 6 of a rotor blade 1 in its lower third facing the rotor base 16. This sensor 5 is firmly connected to the aerodynamic shell 6 of the rotor blade 1 in that it is screwed into a retaining plate 7 that is permanently adhered to the shell 6. The sensor 5 is connected, via a cable 10 running inside the rotor blade 1, to a sensor supply and measuring value pre-processing unit 11 that is situated in the hub 2. In the execution example, the cable 10 as well as the sensor 5 is protected against mechanical damage by a protective sheath and against electrical fields, which can be emitted from lightning conducting systems for example, by a shield. The other two rotor blades of the wind power installation are each fitted with an additional accelerometer, both of which are connected to the sensor supply and measuring value pre-processing unit 11 via an additional cable.

The sensor supply and measuring value pre-processing unit 11 is connected via wireless transmission, i.e. by means of radio transmission, to an evaluation unit 12 that is not described in further detail and is situated in the nacelle 3 or in the base of the tower 4 and is generally linked to other computers 26 via an interface 15. The device also comprises an operating data module 18 and a meteorology module 17 that are also not shown in further detail and are situated in the nacelle 3, in the tower 4 or in another position suitable for recording this data.

As shown in FIG. 3, the aerodynamic shell 6 is supported by internal, load-bearing components 9. The accelerometer 5 is fastened to the inner surface of the aerodynamic shell 6 by means of the retaining plate 7 in such a way that the acceleration direction of the sensor 5 is aligned vertical to the retaining plate 7 and therefore surface-normal to the aerodynamic shell 6.

A state measurement of a rotor blade 1 on the operational wind power plant (online measurement) is described below.

The evaluation of the measuring signals, the comparison with the reference spectra and the state assessment of the rotor blade 1 are not comparable for this and for measurements on non-operational installations or individual, unassembled rotor blades (offline measurement).

With online measurements, the requisite vibration excitation is generally carried out by means of the operation itself and the wind blowing at the rotor blade 1. As a result of this continuous vibration excitation, the sensor 5 attached in the aerodynamic shell 6 of the rotor blade 1 provides electrical analogue signals as time-specific amplitude signals that are guided to the sensor supply and measuring value pre-processing unit 11 in the hub 2 via the cables 10.

In the sensor supply and measuring value pre-processing unit 11, which simultaneously serves as the sensor supply, digitization of the signals, radio transmission to the evaluation unit 12 that has a central computer unit 13 (FIG. 4), and also the measuring control are carried out in order to ensure reliable control independently of the radio transmission between the sensor supply and measuring value pre-processing unit 11 and the central computer unit 13. For state measurement, several, for example 20, individual measurements are successively recorded and supplied to the evaluation unit 12. Each individual measurement is triggered, in terms of its start of measurement, by means of the sensor supply and measuring value pre-processing unit 11 according to any rotational angle 14, although said angle must be fixed for the measuring period. In the execution example, triggering is carried out by an additional sensor that is not described in further detail and transfers rotational angle information for the time-related control to the sensor supply and measuring value pre-processing unit 11.

In the central computer unit 13, a one-dimensional spectrum is obtained by means of Fourier transformation from the recorded time signals of the individual measurements for each rotor blade 1. The individual spectra as Fourier-transformed reproductions of the individual measurements are successively accumulated, with known standardization and weighting methods being applied to the individual spectra.

In parallel with the structure-borne noise measurements of the rotor blades 1, structure-borne noise signals that are transmitted from the driveline of the wind power installation to the rotor blades 1 are determined and evaluated in a comparable manner with one or preferably more multidimensional sensors 5. The spectrum changes from the measurements on the rotor blades 1 are corrected with these interference spectra.

The state spectrum thus obtained is subjected to a spectrum analysis and the numerical values for natural frequencies contained in the spectrum, if applicable fundamental waves and harmonic waves, and their amplitudes are obtained. These are then represented in vectors or a matrix, for example.

Furthermore, during the state measurement of the rotor blade 1 by the system itself, up-to-date measuring values are transmitted from a meteorology module 17 and an operating data module 18 to the central processing unit 13, such as temperature of the rotor blade 1, the power output of the wind power installation or alternatively the wind speed and operation period of the respective rotor blade 1.

In a spectrum library 19, which is part of the evaluation unit 12, rotor blade type-specific reference spectra that have a data structure like the measured spectrum, in the execution example as a vector or matrix, and that are parameterized in terms of the above-mentioned applicable measured values and are in turn arranged by state of damage and particular state, are provided in a database that preferably ensures fast selective access. These reference spectra have been determined from measurements on wind power installations in which states of damage have occurred, through offline measurements on undamaged and damaged rotor blades 1 on the ground and/or through equivalence assessments.

With a suitable mathematically statistical method that works, for example, with defined confidence intervals and other statistical parameters such as the coefficient of determination, the state spectrum measured in each case online on a quasi-continuous basis is sorted in terms of the technical and physical parameters provided from the meteorology module 17 and the operating data module 18 and the other known technical and physical parameters, compared with the reference spectra maintained in the database with identical parameterization, and the current state of the respective rotor blade 1, either the normal state 21 or the state of damage or particular state 20, is established. If a state of damage or particular state 20 is established, additional, lower-level states can be determined, such as significant 22 and non-significant deviations 23 of the rotor blade state from the normal state. This or another subdivision of the states of damage and particular states that takes into account additional deviations 24 is carried out in accordance with the parameterization of the spectrum library 19. Non-assignable state spectra are categorized as defective, particularly for safety reasons, and can be interpreted by experts if applicable.

Each determined state 21 to 24 is transferred to an operating decision module 25 and a corresponding state message is generated. The state message is in turn transmitted to an input and output unit 27, which is part of the evaluation unit 12 and, for example, comprises a binary output module via which the state messages can be passed on to the installation control system 28 in a redundant, externally and intrinsically safe manner. Visualization of the measured data, stored and event-specific data is also implemented via the input and output unit 27 or also via the backup server 26, to which an authorized user can have access via a web browser.

In specific fixed periods and when events occur, by means of data transmission via a suitable interface 15, the continuously obtained data of the measuring cycles of the central computer unit 13 is directly stored in a backup server 26 that is independent of the central computer unit 13 and is in turn integrated into a data backup.

REFERENCE LIST

1 Rotor blade
2 Hub
3 Nacelle
4 Tower
5 Sensor, accelerometer
6 Aerodynamic shell
7 Retaining plate, attachment
8 Displacement orientation
9 Load-bearing components
10 Cable
11 Sensor supply and measuring value pre-processing unit
12 Evaluation unit
13 Central computer unit
14 Rotational angle
15 Interface
16 Rotor blade base
17 Meteorology module
18 Operating data module
19 Spectrum library
20 Establishment of state of damage or particular state
21 Establishment of normal state
22 Significant deviation 23 Non-significant deviation
24 Other deviations
25 Operating decision module
26 Other computers, backup server
27 Input and output unit
28 Installation control system

The invention claimed is:

1. A method for monitoring the state of rotor blades on wind power installations comprising;
   measuring structure-borne noise of at least one rotor blade with at least one sensor fastened on the rotor blade such that the at least one sensor rotates with the at least one rotor blade,
   the at least one sensor is connected to a unit for wireless transmission of the output signals of the sensors to an evaluation unit that comprises a central computer unit and storage devices,
   the output signals of the at least one sensor being wirelessly transmitted to the evaluation unit where, from the signals a frequency spectrum is determined,
   the frequency spectrum is compared with parameterized reference spectra corresponding to defined states of damage and other particular states and stored in the evaluation unit, and the state of the rotor blade is determined therefrom,
   a structure-borne noise is measured from a sequence of several individual measurements carried out directly one after the other by the at least one sensor, the beginning of each of said individual measurements being triggered according to a uniform rotational angle of the rotor blade in relation to the rotational axis of the rotor;
   all of the determined frequency spectra of each individual measurement being accumulated to determine the frequency spectrum before being compared with the reference spectra;
   the reference spectra parameterized by means of at least one of meteorological and installation-specific data; and
   the parameters of the reference spectra determined in an up-to-date manner in parallel with the structure-borne noise measurement by means of additional measurements and transferred to the evaluation unit.

2. The method for monitoring the state of rotor blades according to claim 1, wherein the structure-borne noise of a rotor blade is measured in a multidimensional manner with several sensors, which are preferably differently aligned and synchronized.

3. The method for monitoring the state of rotor blades according to claim 2, wherein the vibration characterization is carried out in an orthogonal coordinate system.

4. The method for monitoring the state of rotor blades according to claim 1, wherein the triggering of each individual measurement of a measuring period is actuated according to a uniform rotational angle by means of an additional sensor that passes on up-to-date rotational angle information to a sensor supply and measuring value pre-processing unit that controls the measurement.

5. The method for monitoring the state of rotor blades according to claim 1, wherein each individual measurement of a measuring period is triggered according to a uniform angle on the basis of software in the evaluation unit by selecting each individual measurement from larger measuring ranges of one or more measurements by means of periodicity-specific starting criteria.

6. The method for monitoring the state of rotor blades according to claim 1, wherein the frequency spectra of the individual measurements of the rotor blade are adjusted for the interference that is transmitted from the installation to the rotor blade by performing structure-borne noise measurement by means of one or more one-dimensional or multidimensional sensors.

7. The method for monitoring the state of rotor blades according to claim 1, wherein the reference spectra are subdivided into at least two state groups and the state of a rotor blade is assigned to one of the state groups by means of the spectrum comparison.

8. The method for monitoring the state of rotor blades according to claim 1, wherein harmonic waves in the accumulated frequency spectrum are determined.

9. The method for monitoring the state of rotor blades according to claim 8, wherein the harmonic waves of the rotational frequency of the rotor blades in the accumulated frequency spectrum are determined.

10. The method for monitoring the state of rotor blades according to claim 1, wherein with defined states of a rotor blade, a state message is generated in the evaluation unit and passed on to the installation control system of the wind power installation and influence is exerted on the operation of the wind power installation.

11. The method for monitoring the state of rotor blades according to claim 1, wherein a rotor blade is actively stimulated by means of a vibration exciter.

12. The method for monitoring the state of rotor blades according to claim 11, wherein stimulation is carried out with the vibration exciter continuously passing through a relevant frequency range.

13. The method for monitoring the state of rotor blades according to claim 1, wherein the measured frequency spectra are compared with the reference spectra by means of pattern recognition methods.

14. The method for monitoring the state of rotor blades according to claim 1, wherein the measured frequency spectra are assigned to the reference spectra by means of statistical methods.

15. The method for monitoring the state of rotor blades according to claim 1, wherein the measured frequency spectra are subjected to a spectrum analysis and the determined natural frequency values as well as their amplitudes are represented in vectors or matrices.

16. The method for monitoring the state of rotor blades according to claim 1, wherein the wireless transmission of the pre-processed and reprocessed measuring signals of the sensor is carried out by means of radio transmission.

17. A device for monitoring the state of rotor blades on wind power installations according to claim 1, wherein the at least one sensor inside and outside the rotor blade is firmly attached to at least one of a surface of the aerodynamic shell and internal components of the rotor blade; and
   an additional sensor arranged on the rotor blade as a trigger sensor for measuring rotational angle measurements to cause said individual measurements to be taken at said uniform rotational angle.

18. The device for monitoring the state of rotor blades according to claim 17, wherein the sensors are accelerometers.

19. The device for monitoring the state of rotor blades according to claim 17, wherein at least one one-dimensional sensor is arranged.

20. The device for monitoring the state of rotor blades according to claim 17, wherein at least one multidimensional sensor is arranged.

21. The device for monitoring the state of rotor blades according to claim 17, wherein a displacement orientation of a sensor is largely aligned vertical to the surface on which the sensor is fastened.

22. The device for monitoring the state of rotor blades according to claim 17, wherein a sensor is fastened in the lower third of the rotor blade facing the rotor blade base on a surface of the aerodynamic shell of the rotor blade.

23. The device for monitoring the state of rotor blades according to claim 17, wherein a second sensor is fastened to the load-bearing components inside the rotor blade.

24. The device for monitoring the state of rotor blades according to claim 17, wherein a temperature sensor for measuring the rotor blade temperature is fastened to the rotor blade.

25. The device for monitoring the state of rotor blades according to claim 17, wherein a position sensor for measuring the pitch angle is fastened to the rotor blade.

26. The device for monitoring the state of rotor blades according to claim 17, wherein a database that enables fast, selective access is stored in the evaluation unit as a spectrum library with reference spectra of rotor blades with damage-free and defined states of damage and particular states.

27. The device for monitoring the state of rotor blades according to claim 17, wherein the evaluation unit is connected to a decentralized, remotely set-up backup server.

28. The device for monitoring the state of rotor blades according to claim 17, wherein the evaluation unit comprises an output unit, with a binary output module that is externally and intrinsically safe and outputs redundant signals.

29. The device for monitoring the state of rotor blades according to claim 17, wherein the output signals of several wind power installations are transmitted to a joint evaluation unit and evaluated by said unit.

30. The device for monitoring the state of rotor blades according to claim 17, wherein additional sensors for measuring at least one of meteorological values, installation-specific measuring values and installation-specific vibration states are arranged on the wind power installation.

31. The device for monitoring the state of rotor blades according to claim 17, wherein attachments for holding sensors are arranged at least one of inside and outside the rotor blade at different vibration-relevant points.

32. The device for monitoring the state of rotor blades according to claim 17, wherein at least one one-dimensional or multidimensional vibration exciter is arranged on the aerodynamic shell or on an internal component of the rotor blade.

33. The device for monitoring the state of rotor blades according to claim 30, wherein the actuator is a shaker with a power amplifier.

34. A method for monitoring the state of rotor blades on wind power installations comprising;
  measuring structure-borne noise of at least one rotor blade with at least one sensor fastened on the rotor blade such that the at least one sensor rotates with the at least one rotor blade,
  the at least one sensor is connected to a unit for wireless transmission of the output signals of the sensors to an evaluation unit that comprises a central computer unit and storage devices,
  the output signals of the at least one sensor being wirelessly transmitted to the evaluation unit where, from the signals a frequency spectrum is determined,
  the frequency spectrum is compared with parameterized reference spectra corresponding to defined states of damage and other particular states and stored in the evaluation unit, and the state of the rotor blade is determined therefrom,
  a structure-borne noise is measured from a sequence of several individual measurements carried out directly one after the other by the at least one sensor, the beginning of each of said individual measurements being triggered according to a uniform rotational angle of the rotor blade in relation to the rotational axis of the rotor,
  all of the determined frequency spectra of each individual measurement being accumulated to determine the frequency spectrum before being compared with the reference spectra; and
  wherein synchronized measurements of all rotor blades of a wind power installation are performed and the state change of a rotor blade is determined from the difference of the accumulated frequency spectra of all rotor blades and the comparison of the difference spectrum with reference spectra.

35. A method for monitoring the state of rotor blades on wind power installations comprising;
  measuring structure-borne noise of at least one rotor blade with at least one sensor fastened on the rotor blade such that the at least one sensor rotates with the at least one rotor blade,
  the at least one sensor is connected to a unit for wireless transmission of the output signals of the sensors to an evaluation unit that comprises a central computer unit and storage devices,
  the output signals of the at least one sensor being wirelessly transmitted to the evaluation unit where, from the signals a frequency spectrum is determined,
  the frequency spectrum is compared with parameterized reference spectra corresponding to defined states of damage and other particular states and stored in the evaluation unit, and the state of the rotor blade is determined therefrom,
  a structure-borne noise is measured from a sequence of several individual measurements carried out directly one after the other by the at least one sensor, the beginning of each of said individual measurements being triggered according to a uniform rotational angle of the rotor blade in relation to the rotational axis of the rotor, and
  all of the determined frequency spectra of each individual measurement being accumulated to determine the frequency spectrum before being compared with the reference spectra; and
  wherein the reference spectra are determined from statistically evaluated and equivalence-assessed frequency spectra of preceding structure-borne noise measurements of the relevant rotor blade.

* * * * *